United States Patent [19]
Zelby

[11] 3,896,373
[45] July 22, 1975

[54] METHOD AND APPARATUS FOR DETERMINING CROSS-SECTIONAL AREA OF A BLOOD CONDUIT AND VOLUMETRIC FLOW THERETHROUGH

[75] Inventor: Leon W. Zelby, Norman, Okla.

[73] Assignee: Paul D. Stein, Oklahoma City, Okla. ; a part interest

[22] Filed: Nov. 30, 1972

[21] Appl. No.: 310,872

[52] U.S. Cl. ...... 324/57 R; 128/2.05 F; 128/2.05 V; 324/30 R; 324/64; 324/65 R; 324/71 R
[51] Int. Cl. ............................................. G01r 27/00
[58] Field of Search ........ 324/64, 65 R, 30 R, 57 R, 324/71 R; 128/2.05 F, 2.05 V

[56] References Cited
UNITED STATES PATENTS

| | | | |
|---|---|---|---|
| 2,008,046 | 7/1935 | Snelling | 324/65 R |
| 2,552,088 | 5/1951 | Davis | 324/65 R X |
| 2,649,573 | 8/1953 | Goldberg et al. | 324/71 R |
| 2,671,200 | 3/1954 | Lederer | 324/71 R |
| 2,782,364 | 2/1957 | Shuler, Jr., et al. | 324/64 X |
| 2,786,661 | 3/1957 | Herzog et al. | 324/64 X |
| 2,922,103 | 1/1960 | Smith | 324/64 UX |
| 3,417,329 | 12/1968 | Landis et al. | 324/64 X |
| 3,548,304 | 12/1970 | Lohnes | 324/65 R |

*Primary Examiner*—Stanley T. Krawczewicz
*Attorney, Agent, or Firm*—Dunlap & Codding

[57] ABSTRACT

An improved method and apparatus for determining the cross-sectional area of a blood conduit or the like, as defined herein, and, in one form, the instantaneous and continuous volumetric flow therethrough by means of pair of electrodes disposed within the blood conduit (located on a cardiac catheter, in one form). The electrodes are spaced a predetermined distance apart and connected to an electrical power supply, and the voltage drop between the pair of electrodes is measured, the measured voltage drop providing an instantaneous and continuous electrical parameter indicative of the internal cross-sectional area of the blood conduit. In one form, the apparatus includes a flow transducer providing an output velocity signal indicative of the velocity of the fluid flowing through the blood conduit, the product of the determined cross-sectional area and the velocity providing an output indication indicative of the volumetric flow of fluid through the blood conduit and, in one other form, conductivity sensing electrodes are utilized to provide an in vivo determination of the fluid conductivity.

7 Claims, 2 Drawing Figures

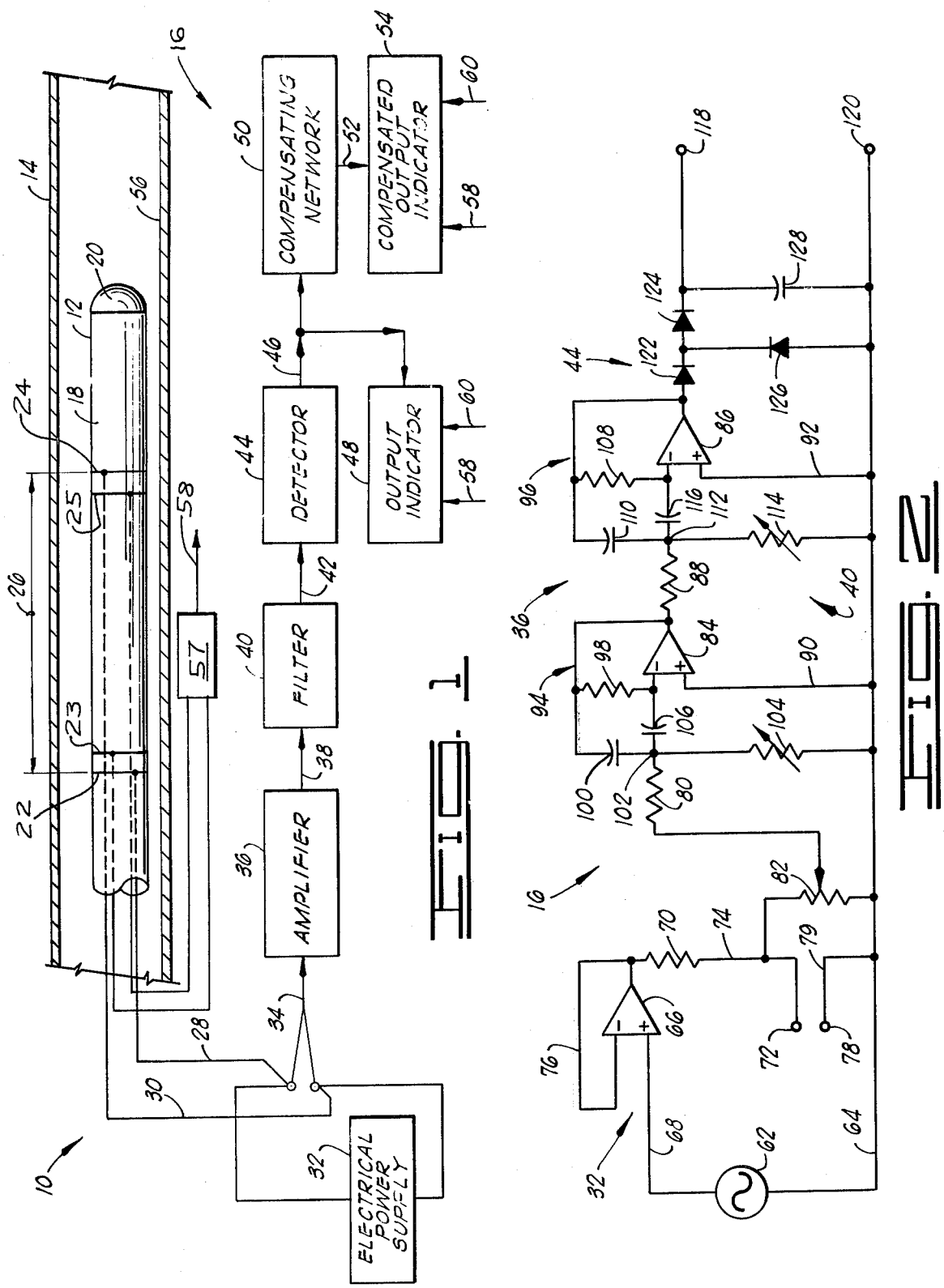

METHOD AND APPARATUS FOR DETERMINING CROSS-SECTIONAL AREA OF A BLOOD CONDUIT AND VOLUMETRIC FLOW THERETHROUGH

BACKGROUND OF THE INVENTION

1. Field of the Invention

This invention relates generally to conduit cross-sectional area and volumetric flow measuring devices and, more particularly, but not by way of limitation, to a method and apparatus for determining the internal cross-sectional area and the volumetric flow of fluid through a blood conduit, or other fluid reservoir or the like as defined herein.

2. Description of the Prior Art

In the past, various devices and theories have been proposed relating to the measurement and determination of various parameters of blood flowing through vessels or the like, such as the velocity and volumetric flow of blood, for example. One prior art device utilized a flow transducer at the tip of a rigid tube for measuring pulsatile coronary flow in dogs; however, due primarily to the relatively large size and rigidity of the apparatus, it was not generally considered to be practically applicable to human beings, the technique and apparatus of this particular flow transducer being discussed in an article entitled Catheter-tip flowmeter for coronary arterial flow in closed-chest dogs (Pieper, H. P. In J. Appl. Physiol. 19:p. 1199. 1964).

The utilization of a thermistor flow transducer located at the tip of a catheter for measurement of coronary sinus flow in dogs was discussed in an article entitled A thermodilution flowmeter (Afonso, S. In J. Physiol. 21:p. 1883. 1966). This particular transducer was generally not capable of sensing direction changes in the fluid flow and had a relatively slow frequency response.

Widely used techniques for measuring fluid flow have been via electromagnetic techniques, such techniques being described in a book entitled Theory of Electromagnetic Flow Measurements (Shercliff, J. A. N.Y., Cambridge University Press, 1962). In many instances, the techniques have required surgical exposure of the vessel. In an effort to circumvent this problem, catheter-tip electromagnetic transducers have been developed. One particular electromagnetic catheter-tip flowmeter for use in the coronary sinus of dogs was described in an article entitled Eine elektromagnetische Stromuhr zur Messung des Coronarsinussausflusses (Lochner, W. and Oswald, S. In Pflueger, Arch. 281:p. 305. 1964). This last-mentioned device had a relatively large diameter, thereby rendering the effective utilization of such devices in human beings relatively difficult. Velocity probes utilizing electromagnetic transducers have been described in articles entitled New catheter-tip flowmeter with velocity flow and volume flow capabilities (Stein, P. D. and Schuette, W. H. In J. Appl. Physiol. 26:p. 851. 1969); A radial field electromagnetic intravascular flow sensor (Kolin, A. In IEEE Trans. Biomed. Engin. 16:p. 220. 1969); A catheter tip electromagnetic velocity probe and its evaluation (Mills, C. J. and Shillingford, J. P. In Cardiovasc. Res. 1:p. 263. 1967); Evaluation of an electromagnetic catheter tip velocity-sensitive blood flow probe (Bond, R. F. and Barefoot, C. A. In J. Appl. Physiol. 23:p. 403. 1967); and An electromagnetic catheter-flowmeter (Kolin, A., Archer, J. D. and Ross, G. In Circ. Res. 21:p. 889. 1967). In general, each of these catheters, with the exception of a radial field electromagnetic intravascular flow sensor, was capable of measuring the volumetric flow only in specific vessels, and usually only in experimental animals. The catheter discussed in An electromagnetic catheter-flowmeter was potentially capable of measuring flow in a larger variety of vessels; but, was generally limited by the necessity of utilizing an external magnetic field.

In recent years, catheter-tip techniques and apparatus have also been developed for measuring some parameters of blood flow in a manner attempting to eliminate the necessity of surgical exposure of the vessel. These particular catheter-tip devices are generally distinguished and commonly referred to in the art as "catheter-tip velocity transducers" for measuring or indicating the rate-of-flow or velocity of the blood within the vessel or blood conduit and "catheter-tip flow transducers" for measuring or indicating the volumetric flow of blood through the vessel. It should be noted that changes in the blood velocity are generally related to changes in flow where the cross-sectional area of the vessel remains constant. However, divergent changes between the velocity and the blood flow may occur as a result of changes in the blood vessel diameter, thereby affecting the practical utilization of catheter-tip velocity sensors. The catheter-tip velocity sensors may thus misleadingly indicate changes in blood flow in situations in which the particular intervention produces changes of the vessel cross-sectional area. For example, coronary sinus blood velocity was demonstrated to vary linearly with left circumflex coronary arterial blood flow in dogs during hypoxia and the administration of sympathomimetic drugs; but linear changes were not demonstrated after the administration of nitroglycerin, this effect being described in an article entitled Velocity of coronary sinus blood flow as an indicator of coronary arterial flow (Stein, P. D., Badeer, H. S., Schuette, W. H. and Zencka, A. E. In Amer. Heart J. 80:p. 202. 1970).

One of the first catheter-tip devices for measuring phasic changes of blood flow was described in an article entitled Die Benutzung des Prinzips der Pitot'schen Rohrchen zur Bestimmung der Blutgeschvindigkeit (Frank, O. In Z. Biol. 37:p. 1. 1899).

Electromagnetic transducers have been applied to the tip of a cardiac catheter and such instruments have been, in general, constructed and utilized for measuring the velocity of the blood flow through large vessels and, in some instances, the volume of the blood flow in specified vessels, some catheter-tip devices being constructed to measure or indicate velocity and flow of blood in particular applications (New catheter-tip flowmeter with velocity flow and volume flow capabilities, supra; A radial field electromagnetic intravascular flow sensor, supra; A catheter tip electromagnetic velocity probe and its evaluation, supra; Eine elektromagnetische Stromuhr zur Messung des Coronarsinussausflusses, supra; An electromagnetic catheter-flowmeter, supra; A new approach to electromagnetic blood flow determination by means of catheter in an external magnetic field, Kolin, A. In Proc. Nat. Acad. Sci. USA. 65:p. 521. 1970; and Evaluation of an electromagnetic catheter tip velocity-sensitive blood flow probe, supra). The electromagnetic catheter-tip velocity probes have some of the general advantages generally attributed to and associated with an all-electromagnetic induction technique, and, in addition, have the advantage of not requiring surgical exposure of the vessel, a substantially important advantage, as mentioned before. Utilizing the electromagnetic catheter-tip velocity probes, the phasic velocity can be measured instantaneously and continuously in a forward and reverse direction.

Some techniques for measurement of volume flow by catheter techniques are as follows: one particular catheter-tip flow transducer proposed in the past for measuring volume flow utilized a fixed orifice on a catheter through which the entire flow to a vessel was caused to pass, and one other such device was constructed to cause the flow to pass through a cylindrical tip at the end of the catheter by distention of a balloon around the cylinder (Eine elektromagnetische Stromuhr zur Messung des Coronarsinussausflusses, supra). Other catheter devices have been constructed to measure flow in the renal or mesenteric arteries by causing the side of the catheter to lodge against the orifice of the artery, the flow passing transversely through the transducer and subsequently into the artery (An electromagnetic catheter-flowmeter, supra). This last-mentioned device was particularly suited for measuring flow in vessels that branch at nearly right angles from the aorta. Devices for measuring of total flow in vessels that branch at more acute angles from the aorta have also been proposed wherein a thin wall cylindrical tip of a catheter was wedged into the vessel while the main body of the catheter remained in the aorta (New catheter-tip flowmeter with velocity flow and volume flow capabilities, supra). Some articles have noted that devices, utilizing the general concept of this last-mentioned device, have been successfully utilized in dogs (Stein, P. D., Velocity and flow measurements by electromagnetic techniques. In Am. J. Cardiol. 29:p. 401. 1972).

Other methods for measurement of volumetric flow by utilization of velocity sensing catheters have incorporated mechanical diameter sensing devices. One other prior art devices utilized an electromagnetic flow sensor mounted on a flexible frame which collapsed as it passed through a small branch of the vessel and expanded to the diameter of the main vascular trunk, this device being described in the following articles: A new approach to electromagnetic blood flow determination by means of catheter in an external magnetic field, supra; and Determination of arterial blood flow by percutaneously introduced flow sensors in an external magnetic field, Kolin, A., Grollman, J. H., Jr., Steckel, R. J. and Snow, H. D. II. Implementation of the method in vivo. In Proc. Nat. Acad. Sci. USA. 68:p. 29. 1971. Diameter measuring devices have been proposed consisting generally of calibrated extendible braces and others have been proposed utilizing flexible metal (radio-opaque) rods or flexible loops constructed to widen to the diameter of the vessel and permit measurement via roentgenograms (Pieper, H. P. and Paul, L. T. Catheter-tip gauge for measuring blood flow velocity and vessel diameter in dogs. In J. Appl. Physiol. 24:p. 259. 1968; Neufeld, H. N., Leibinsohn, S. H., Goor, D., and Nathan, D. A new method of measuring the diameter of blood vessels in vivo. In Lancet. 1:p. 1002. 1965; and Determination of arterial blood flow by percutaneously introduced flow sensors in an external magnetic field, II. Implementation of the method in vivo, supra). The measurement of the internal cross-sectional area of vessels via a coil inserted at the tip of a cardiac catheter has also been proposed wherein the voltage induced via the magnetic field in the coil was considered to be proportional to the instantaneous surface area of the vessel (Baan, J., Iwazumi, T., and Noordergraaf, A. A catheter-tip transducer for the continuous measurement of cross-sectional vessel area and pressure. Fifth Annual Meeting of Assn. for the Adv. of Med. Instr. Boston, Mass. Mar. 23–25, 1970). Further, estimations of the diameter of a vessel have been made utilizing an arteriography, these estimations being subsequently utilized to calculate the total flow (Gabe, I. T., Gault, J. H., Ross, Jr., Jr., Mason, D. T., Mills, C. J., Schillingford, J. P., and Braunwald, E. Measurement of instantaneous blood flow velocity and pressure in conscious man with a catheter-tip velocity probe. In Circ. 60:p. 603. 1969).

In addition to the various articles referenced above, the inventor of the present invention has also written numerous articles concerned with related areas, such as, for example: Zelby, L. W., Brumbaugh, J. M., Nicastro, L. J., and Vollmer, J., A new type of Cerenkov generator - theory and experiment. Proc. of the 4th International Conference on Microwave Tubes, Eindhoven, Netherlands, Sept. 3–7, 1962; Zelby, L. W., The theory of Cerenkov effect based on Lorentz transformations. J. Appl. Phys. 33:p. 2995, 1962; Zelby, L. W., Brumbaugh, J. M., Vollmer, J., Future Astro-Communications. RADC-TDR-62-524, October, 1962; Zelby, L. W., Surface waves along a plasma-air boundary. Proc. IEEE. 51:p. 1774, 1963; Zelby, L. W., Vollmer, J., Influence of source symmetry on Cerenkov radiation. J. Appl. Phys. 36:p. 322. 1965; Zelby, L. W., and Renton, C. A., Longitudinal interaction of microwaves with argon discharge. Appl. Phys. Ltrs. 6:p. 167. 1965; Zelby, L. W., Unified approach to the theory of guided waves. Internatl. J. of Elec. Engng. Ed. 3:p. 39. 1965; Zelby, L. W., Plasma coated surface as a waveguide. RCA Engineer. 11:p. 50. 1965; Zelby, L. W., A simplified approach to the analysis of electromagnetic wave propagation characteristics of plasma-coated surfaces. RCA Review. 26:p. 497. 1965; Zelby, L. W., Slow wave interaction with an argon discharge. Proc. of the International Conference on Properties and Applications of Low Temperature Plasmas, XX International Congress of the IUPAC, Moscow, USSR. July 1965. (Abstract); Zelby, L. W., Microwave interaction with a non-uniform argon discharge. Proc. of the International Conference on Microwave Behaviour of Ferrimagnetics and Plasmas, London, England, Sept. 13–17, 1965; Zelby, L. W., Mehuron, W. O. and Kalagher, R. J. Measurements of electron drift velocity and collision frequency in an argon discharge. Physics Ltrs. 21:p. 522. 1966; Zelby, L. W. et al. Investigation in and research of aerospace related microwave technology. NASA Grant NGR 39-010-030, Moore School Report No. 67-20, February, 1967; Zelby, L. W. Measurements of electronic mean free paths in argon plasmas. Proc. of 21st Annual Southwestern IEEE Conference and Exhibition, San Antonio, Texas, 11C1–11C6, Apr. 23–25, 1969; Zelby, L. W., Wave vector approach to a class of elementary problems in electromagnetics. APS-AAPT Joint Meeting (38th Annual), New York, New York, Feb. 3–6, 1969; Zelby, L. W., Particle distribution in afterglow plasma. Proc. of 22nd Annual Southwestern IEEE Conference and Exhibition, Dallas, Texas, Apr. 22–24, 1970; Zelby, L. W., Cerenkov Radiation in Finite Structures. Proc. of 24th Annual Southwestern IEEE Conference and Exhibition, Dallas, Texas, Apr. 19–21, 1972.

Also, the following additional articles have been published relating to various aspects of measuring blood flow parameters: Stein, P. D., Schuette, W. H., Badeer, H. S., and Glaser, J. F., Pulsatile aspects of coronary sinus blood flow in closed-chest dogs. Am. Heart J. 78:p. 331. 1969; Meduli, E. J. (Blick, E. F., Zelby, L. W. and Stein, P. D., advisors), Technique for measurement of cross-sectional area of blood vessels. Master's Thesis. University of Oklahoma Graduate College 1970; Stein, P. D., Alshabkhoun, S., Hatem, C., Shahriari, A. A. P., Haynes, F. W., Harken, D. E., and Dexter, L., Coronary artery blood flow in acute pulmonary embolism. Am. J. Cardiol. 21:p. 32. 1968; Stein, P. D., Brooks, H. L., Matson, J. L., and Hyland, J. W., Effect of beta adrenergic blockage on coronary blood flow. Cardiovascular Research. 2:p. 63. 1968; Stein, P. D., Alshabkhoun, S., Hawkins, H. F., Hyland, J. W. and Jarrett, C. E. Right coronary blood flow in acute pulmonary embolism. Am. Heart J. 77:p. 356. 1969; Brooks, H. L., Stein, P. D., Matson, J. L., and Hyland, J. W. Dopamine induced alterations in coronary hemodynamics in dogs. Circ. Research. 24:p. 690. 1969; Valdes, L. B., Resistivity measurements on germanium for transistors. Proc. IRE. 42:p. 420. 1954; Stearns, C. A. Four-probe instrument for resistivity measurements of germanium and silicon. Rev. Sci. Inst. 24:p. 884. 1953; Muller, O. and Shillingford, J. The blood flow in the right atrium and superior vena cava in tricuspid incompetence. Brit. Heart J. 17:p. 163. 1955; Nolan, S. P., Fisher, R. D., Dixon, S. H., Jr., and Morrow, A. G. Quantification of aortic regurgitation with a catheter tip velocitometer. Surgery. 65:p. 876. 1969; Shabetai, R. and Bowles, S. The dynamics of cardiac compression: A flowmeter study of the differences between constrictive pericarditis and cardiac tamponade (Abstr). Amer. J. Cardiol. 25:p. 127, 1970; Noble, M. I. M., Trenchard, D. and Guz, A., Left ventricular ejection in conscious dogs: 1. Measurement and significance of the maximum acceleration of blood from the left ventricle. Circ. Res. 19:p. 139, 1966.

In addition to the various devices generally mentioned above and discussed in the above-referenced articles, various other devices have been proposed in the past for measuring or detecting various parameters relating to the flow of blood within a blood conduit or, in general, related to the flow of fluid through a conduit. One such device was disclosed in the U.S. Pat. No. 3,242,729, issued to Keller, wherein three electrodes were inserted into a flow stream, two of the electrodes being connected to apparatus for obtaining a resistance measurement therebetween and two of the electrodes being connected to a power supply. Considering that the degree of polarization between the two electrodes connected to the power supply varied inversely with the blood flow rate generally over the polarized electrodes, the measured current between one of the polarized electrodes and the third electrode was considered to be a function of the degree of polarization and thus an indication of the blood flow rate. A rate-of-blood-flow measuring device was also disclosed in the U.S. Pat., No. 3,078,841, issued to Brownson, similar devices and other devices relating to the measurement of various blood flow parameters or liquid flow parameters are disclosed in the U.S. Pat. Nos.: 3,593,118, issued to Chaney; 3,416,369, issued to Higgins; 2,708,928, issued to Zenatti; 3,310,049, issued to Clynes; 3,498,290, issued to Shaw; and 3,488,584, issued to Ziniuk.

SUMMARY OF THE INVENTION

An object of the invention is to provide a rapidly responding, convenient and efficient method and apparatus for determining the internal cross-sectional area of a conduit, particularly useful with respect to blood vessels.

Another object of the invention is to provide a rapidly responding, convenient and efficient method and apparatus for determining the volumetric flow of fluid through a blood conduit, by means of the disclosed area sensing device utilized in conjunction with velocity sensing devices or the like.

One other object of the invention is to provide a fast, convenient and efficient method and apparatus for determining and providing an output indication indicative of the continuous and the instantaneous volumetric flow of fluid through a blood conduit in a manner eliminating the necessity of surgical exposure of the blood conduit.

Yet another object of the invention is to provide an apparatus for simultaneously determining the velocity of the fluid flowing through a blood conduit and the cross-sectional area of the blood conduit.

Still another object of the invention is to provide a method and apparatus for measuring and determining the volumetric flow of fluid through a blood conduit substantially independent of the direction of the flow of fluid through the blood conduit.

Another object of the invention is to provide an apparatus for determining and providing an output indication of the cross-sectional area of a blood conduit which can be utilized in cooperation with available velocity sensing catheters, thereby providing an economical and efficient apparatus for determining the velocity of the fluid flowing through a blood conduit and the cross-sectional area of the blood conduit.

One other object of the invention is to provide a method and apparatus for determining and providing an output indication of the cross-sectional area of a blood conduit and the volumetric flow of blood through the blood conduit which is economical in construction and operation.

Another object of the invention is to provide a method and apparatus for providing an in vivo determination of the fluid (blood) conductivity.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a diagrammatical, fragmentary view of the catheter of the present invention disposed within a portion of a blood conduit and a schematic view of the control apparatus diagrammatically showing some aspects of the method and apparatus of the present invention.

FIG. 2 is a schematic view showing one preferred embodiment of a portion of the control apparatus diagrammatically shown in FIG. 1.

DESCRIPTION OF THE PREFERRED EMBODIMENTS

The present invention provides a convenient, economical, accurate and efficient method and apparatus for determining the internal cross-sectional area of a blood conduit and for determining a continuous and an instantaneous indication of the volumetric flow of fluid (blood) through a blood conduit in a manner eliminating the necessity of surgical exposure of the blood conduit, in a manner to be described in detail below. In general, a pair of electrodes, spaced a predetermined distance apart, are disposed within the blood conduit and a predetermined electrical power source is connected between the pair of electrodes impressing a predetermined, known electrical energy therebetween, the determination of a resulting electrical parameter measured between the pair of electrodes providing an output indication indicative of the internal cross-sectional area of the blood conduit. In one form, the velocity of the blood or fluid flowing through the blood conduit is determined and utilized along with the measured and determined blood conduit cross-sectional area to provide an output indication indicative of the instantaneous and continuous volumetric flow of fluid through the blood conduit. The present invention also provides a method and apparatus for measuring and providing an in vivo determination of the blood conductivity, in one aspect, in a manner to be described in greater detail below.

It should be particularly noted that the term "blood conduit" is utilized herein to denote any fluid-carrying conduit and, in one application includes a vein, vessel, artery, or the like, the method and apparatus of the present invention being adapted to indicate the internal cross-sectional area of a fluid-carrying conduit, and the term "blood conduit" should not be construed to limit the present invention to a blood carrying type of conduit, the blood carrying conduit being utilized herein to describe the present invention with respect to one particular application. The present invention is particularly suited for measuring the internal cross-sectional area of a coronary artery or the coronary sinus, and providing an output indication indicative of the coronary arterial volumetric blood flow or coronary sinus blood drainage at the time of diagnostic cardiac catheterization, though the method and apparatus of the present invention are not limited to such a use. In addition, the present invention is adapted to measure and provide an output indication indicative of the instantaneous and continuous volumetric flow of fluid through a blood conduit substantially independent of the direction of blood flow, in a manner to be made more apparent below.

Referring to the drawings in general, and to FIG. 1 in particular, shown therein and designated by the general reference numeral 10 is an indicator apparatus having a catheter 12 constructed to be inserted lengthwise within a blood conduit, a fragmentary portion of the blood conduit being diagrammatically shown in FIG. 1 and designated therein by the general reference numeral 14, and a control apparatus 16 connected to a portion of the catheter 12 and constructed to apply or impress a predetermined, known electrical energy to a portion thereof and provide an output indication indicative of the internal cross-sectional area of the blood conduit and, in one form, to provide an output indication indicative of the continuous and instantaneous volumetric flow of fluid through the blood conduit, in a manner to be described in greater detail below.

In one preferred embodiment, as diagrammatically shown in FIG. 1, the catheter 12 includes a hollow, flexible tube 18 having a flow transducer 20 secured generally within one end portion of the tube 18, the catheter 12 being constructed for insertion lengthwise through the blood conduit 14 to place or dispose the flow transducer 20 at a predetermined position within a blood conduit 14. The flow transducer 20 is constructed to sense the velocity of the fluid flowing within the blood conduit 14 and to provide a "velocity signal" output indication indicative of the velocity of the fluid flowing through the blood conduit 14. The velocity signal is connected to a portion of the indicator apparatus 10 via conductors (not shown) connected on one end to the flow transducer 20 and extended lengthwise through the hollow portion of the tube 18, in one preferred form and in a manner to be made more apparent below. Various forms of catheters having transducers connected thereto and constructed in a manner similar to that described before with respect to the catheter 12 and the flow transducer 20 for sensing and measuring blood flow velocity and providing an output velocity signal indicative thereof, are known in the art, some of the catheters of this type being generally described in the various articles and patents referred to before in the discussion of the prior art contained herein. One particular catheter, having an electromagnetic type of flow transducer equipment, found to be suitable for use with the method and apparatus of the present invention is commercially available from such companies as United States Catheter & Instrument Corporation of Glens Falls, New York, and Carolina Medical Electronics of King, North Carolina.

As shown in FIG. 1, a pair of electrodes 22 and 24 are secured to the tube 18, generally near the flow transducer 20, and spaced apart a predetermined distance 26. A conductor 28 is connected to the electrode 22, and a conductor 30 is connected to the electrode 24. Each of the conductors 28 and 30 are disposed generally within the hollow portion of the tube 18, extended lengthwise therethrough, and exited from the end portion of the tube 18, opposite the flow transducer 20 end thereof, the conductors connected to the flow transducer 20 being disposed through the tube 18 in a similar manner.

It should be noted that, since the internal cross-sectional area of a blood conduit is generally not uniform throughout the length of the blood conduit, the electrodes 22 and 24 are, more particularly, spaced and disposed on the tube 18 of the catheter 12 to cooperate with the control apparatus 16 for providing an output indication indicative of the average cross-sectional area of the blood conduit, generally between the pair of electrodes 22 and 24. Thus, the relative accuracy of the method and apparatus of the present invention generally increases as the spacing or distance 26 between the electrodes 22 and 24 is reduced or minimized. The practical, minimum spacing 26 between the electrodes 22 and 24 is, in general, dependent upon the sensitivity of the control apparatus 16 and the desired accuracy in a particular application. In this regard, it should further be noted that the electrical power source utilized in the method and apparatus of the present invention is preferably constructed to impress a relatively small current between the electrodes 22 and 24, the relatively small current being utilized for the primary purpose of safety, and resulting in a relatively small voltage drop between the pair of electrodes 22 and 24 due to the relatively high conductivity of the fluid (blood) therebetween. In one particular application, utilizing an electrode spacing 26 of approximately 10.0 mm. and an electrical power source impressing currents in the region of the electrodes 22 and 24 of approximately 10.0 microamps, meaningful results were obtained relating the measured and determined voltage drop between the electrodes 22 and 24 to the cross-sectional areas of blood conduits utilizing the method and apparatus of the present invention, for example.

As shown in FIG. 1, the conductors 28 and 30 are connected to an electrical power source 32 which, in a preferred form, is constructed to provide a constant predetermined, known electrical energy and, more particularly, a current at a known, predetermined frequency and magnitude. More particularly, the two electrodes 22 and 24 and the electrical power supply 32 are connected to comprise an equivalent series circuit, and the measured and determined electrical parameter indicative of the internal cross-sectional area of the blood conduit 14 is measured essentially between the two electrodes 22 and 24, in a manner to be described in greater detail below.

In one preferred form, the measured and determined electrical parameter indicative of the internal cross-sectional area of the blood conduit 14 is related to the electrical resistance measured between the pair of electrodes 22 and 24 disposed within the blood conduit, spaced apart a known, predetermined distance 26 and having a known, predetermined current impressed therebetween via the electrical power supply 32, the measured and determined electrical parameter being the voltage drop measured between the pair of electrodes 22 and 24, in a preferred form, as mentioned before.

It should also be noted that, in some applications, the control apparatus 16 is constructed to measure and determine other electrical parameters such as the capacitance or the inductance generally between the pair of electrodes 22 and 24 and to relate the measured capacitance or the measured inductance to the cross-sectional area of the blood conduit to provide the output indication indicative thereof, in a manner similar to that described before with specific reference to the electrical parameter of the resistance between the electrodes 22 and 24. In any event, the measured and determined value of the electrical parameters of resistance, capacitance and inductance are each related to and determinable from the measured voltage drop between the electrodes 22 and 24 impressed with a predetermined, known current, the phase between the current and the voltage between the electrodes 22 and 24 being additionally required where the electrical parameter is the inductance or the capacitance, in a manner to be made more apparent below.

In any event, the electrical parameter signal 34, indicative of the measured electrical parameter between the electrodes 22 and 24 resulting from a known current being impressed therebetween via the electrical power source 32, is connected to and amplified via an amplifier 36, the amplified output signal 38 being connected to a filter 40, having a filter output signal 42, as diagrammatically shown in FIG. 1. The filter output signal 42 is connected to a detector 44, having a detector output signal 46. The filter 40 is basically constructed and, in a preferred form, adjustable to eliminate interference from power lines or other such electrical or electronic equipment operating in the vicinity and the detector is basically constructed to provide a smoother output signal for greater average accuracy.

The detector output signal 46 is connected to an output indicator 48 and to a compensatng network 50, the compensating network output signal 52 being connected to a compensated output indicator 54, as shown in FIG. 1. The output indicator 48 is constructed, in one form, to receive the detector output signal 46 and to provide an output indication responsive thereto and indicative thereof, the output indication being thus indicative of the measured electrical parameter between the electrodes 22 and 24. In a particular application, the output indication provided via the output indicator 48 can take the form of a digital read-out or be in the form of a recording on a chart or the like, for example. Apparatus constructed to receive signals and provide various forms of perceivable output indications responsive thereto and indicative thereof are commercially available and well-known in the art.

Referring to the blood conduit 14, diagrammatically shown in FIG. 1, the measured electrical parameter indicated via the output indicator 48 is, more particularly, related to or indicative of the average internal cross-sectional area formed by the wall 56 of the blood conduit 14 generally between the electrodes 22 and 24, the measured electrical parameter being subsequently utilized to determine the internal cross-sectional area of the blood conduit 14. For example, the various determined values of a particular electrical parameter can be related to the internal cross-sectional area of the blood conduit 14 utilizing emmpirically determined data to provide a curve, table or the like correlating the values of the electrical parameter and the empirically determined internal cross-sectional areas. A particular output indication of the output indicator 48 can then be converted to a corresponding internal cross-sectional area utilizing the correlation table or chart or the like, In general, the electrical parameters of resistance, capacitance and inductance depend on the electrical properties of the fluid and the geometry of the fluid conduit. In those applications where the blood conduit 14 is basically a simple cylindrical shape, the electrical parameter of resistance between the pair of electrodes 22 and 24 is related to the internal cross-sectional area of the blood conduit 14 via the following algebraic expression.

$$R = \frac{V}{I} = \frac{l}{\rho A} \qquad (1)$$

wherein:
R = the measured and determined electrical resistance between the pair of electrodes 22 and 24;
V = the measured and determined voltage drop generally between the pair of electrodes 22 and 24;
I = the predetermined, known current impressed generally between the pair of electrodes 22 and 24 via the electrical power source 32;
$l$ = the spacing or the distance 26 between the pair of electrodes 22 and 24;

A = the internal cross-sectional area of the blood conduit 14; and $\rho$ = the condutivity of the fluid flowing through the blood conduit 14.

The conductivity ($\rho$) of the fluid flowing in the blood conduit 14 is determined in vitro, in one form of the invention, by withdrawing a sample of the fluid (blood) and measuring the conductivity of the withdrawn sample via conventional methods and apparatus. This particular method for determining the fluid conductivity generally assumes that the conductivity of the walls 56 of the blood conduit 14 do not significantly affect the conductivity of the fluid flowing within the blood conduit 14 and provides satisfactory results in some applications. However, an in vivo determination of the conductivity ($\rho$) of the fluid flowing through the blood conduit 14 provides a relatively more accurate determination of conductivity ($\rho$) which may be desirable in some applications. Thus, in one form of the invention, two additional conductivity sensing electrodes 23 and 25 are secured to the tube 18, generally near and between the electrodes 22 and 24, and a control apparatus 57 is connected to the two conductivity sensing electrodes providing an output signal 58 indicative of the conductivity of the fluid flowing within the blood conduit 14, considering the electromagnetic field distribution between the conductivity sensing electrodes.

Thus, in one form, the output indicator 48 is, more particularly, constructed to receive a conductivity signal 58 indicative of the conductivity of the fluid flowing through the blood conduit 14 determined in vivo or in vitro, in a manner described before, and a velocity signal 60 indicative of the velocity of the fluid flowing through the blood conduit 14 determined via the flow transducer 20 portion of the catheter 12, as diagrammatically shown in FIG. 1. In this form, the distance 26 between the electrodes 22 and 24 and the current impressed between the electrodes 22 and 24 via the electrical power source 32 are each programmed into the output indicator 48, or the output indicator 48 is calibrated in accordance with the before-mentioned values, and the output indicator 48 is constructed to utilize the detector output signal 46 indicative of the voltage drop between the two electrodes 22 and 24 to determine the internal cross-sectional area of the blood conduit 14 between the electrodes 22 and 24 utilizing an algebraic relationship similar to the algebraic relationship (1) above, the output indicator 48 being constructed in this form to directly provide a digital, chart or other such output indication of the internal cross-sectional area of the blood conduit 14 between the electrodes 22 and 24.

In those applications where the blood conduit is considered to be basically a simple cylindrical shape, the electrical parameter of capacitance is related to the internal cross-sectional area of the blood conduit 14 via the following algebraic expression.

$$C = \frac{\epsilon A}{l} \quad (2)$$

wherein:

$l$ = the spacing or the distance 26 between the pair of electrodes 22 and 24;

A = the internal cross-sectional area of the blood conduit 14;

C = the measured and determined electrical capacitance between the pair of electrodes 22 and 24; and $\epsilon$ = the measured and determined permittivity of the fluid flowing through the blood conduit 14. Further, considering the blood conduit 14 to be basically a simple cylindrical shape, the electrical parameter of inductance is related to the internal cross-sectional area of the blood conduit 14 via the following algebraic expression.

$$L = \frac{\mu A}{l} \quad (3)$$

wherein:

L = the measured and determined electrical inductance between the pair of electrodes 22 and 24;

A = the internal cross-sectional area of the blood conduit 14;

$l$ = the spacing or distance 26 between the pair of electrodes 22 and 24; and $\mu$ = the measured and determined permeability of the fluid flowing through the blood conduit 14.

Referring to the algebraic expressions (1), (2) and (3) above, it should be noted that the functional relationships expressed thereby become more complicated with increase complexity of the fluid conduit and shape of electrodes; however, the dimensions enter into the relationships explicitly, in any event. Thus, utilizing the measured and determined electrical parameters of either resistance, capacitance or inductance, the internal cross-sectional area of the blood conduit 14 can be determined utilizing the method and apparatus contemplated by the present invention, the values of the fluid permittivity ($\epsilon$) and permeability ($\mu$) being determined via conventional techniques and apparatus known in the art. It should be noted that, in those instances where the electrical parameter is the capacitance or the inductance between the electrodes 22 and 24, the phase relationship between the voltage and the current is also measured and determined via conventional apparatus preferably connected to the control apparatus 16 at the output of the filter 40 or, in other words, at the input to the detector 44. It should also be noted that, in those applications where the electrical parameter is the capacitance or the inductance between the electrods 22 and 24, the output indicator 48, the compensating network 50 and the compensated output indicator 54 are each constructed in a manner similar to that described before with respect to the electrical parameter of resistance, since the electrical parameters of resistance, inductance and capacitance are each related to the measured and determined voltage drop between the pair of electrodes 22 and 24, the output indicator 48 and the compensated output indicator 54 each being constructed to receive a permeability or a permittivity indicating signal in lieu of the conductivity signal 58, as described before.

Since the velocity of the fluid through the blood conduit 14 and the internal cross-sectional area of the blood conduit 14 between the electrodes 22 and 24 are determined in a manner described before, the output indicator 48 is also constructed, in one preferred form, to provide an output indication indicative of the volumetric flow of fluid (blood) through the blood conduit 14 in the vicinity of the electrodes 22 and 24 utilizing the algebraic expression or relationship as follows.

$$Q = AV \quad (4)$$

wherein:
Q = the volumetric flow of the fluid flowing within the blood conduit 14 generally in the vicinity of the electrodes 22 and 24, expressed in terms of milliliters per second, for example;
A = the determined internal cross-sectional area of the blood conduit 14 generally between the electrodes 22 and 24 expressed in terms of square centimeters, for example; and
v = the velocity of the fluid flowing within the blood conduit 14 generally in the vicinity of the electrodes 22 and 24 expressed in terms of centimeters per second, for example, and determined via the flow transducer 20, in one form.

The compensating network 50 is, more particularly, constructed to linearize the impedance measurements or, more particularly, the measured and determined voltage drop between the pair of electrodes 22 and 24 to provide a linearized compensating network output signal 52 to relate linearly the internal cross-sectional area of the blood conduit 14 between the two electrodes 22 and 24 to the voltage drop therebetween. The compensating network 50 thus simplifies the construction of the output indicator via linearizing the relationship between the measured voltage drop between the electrodes 22 and 24 and the internal cross-sectional area of the blood conduit 14 between the two electrodes 22 and 24. The relationship between the measured voltage drop between the electrodes 22 and 24 and the internal cross-sectional area of the blood conduit 14 has been experimentally determined to be generally exponential in form and, in ths event, the compensating network 50 consists essentially of a logarithmic amplifier, for example.

The compensating network output signal 52 is connected to the compensated output indicator 54 which is constructed to provide an output indication in response thereto and indicative thereof. The compensated output indicator 54 is, in one form, constructed to receive the conductivity signal 58, or permittivity indicating signal or permeability indicating signal depending on the electrical parameter and the velocity signal 60 and to provide direct output indication of the internal cross-sectional area of the blood conduit 14, the current and the distance 26 between being programmed or calibrated into the compensated output indicator 54, in a manner similar to that described before with respect to the output indicator 48.

Shown schematically in FIG. 2 is one preferred embodiment of the electrical power source 32, the amplifier 36, the filter 40 and the detector 44 constructed for impressing a predetermined, known current between the electrodes 22 and 24 and measuring and determining the voltage drop between the electrodes 22 and 24 to provide an output indication indicative of the internal cross-sectional area of the blood conduit 14. The electrical power source 32, more particularly, includes an alternating current power source 62, preferably a signal generator of the variable frequency type, connected to a ground conductor 64 and to the positive input of a unity gain operational amplifier 66 via a conductor 68. The frequency utilized in a particular application depends on such parameters as the electrical property of the fluid, for example, the particular frequency being generally high through the microwave range in the case of low conductivity fluids since the electrical parameter in these applications is preferably the electrical capacitance between the pair of electrodes 22 and 24, and generally low in the case of medium and high conductivity fluids since the electrical parameter in these applications is preferably the electrical inductance or resistance between the pair of electrodes 22 and 24.

The output signal from the operational amplifier 66 is connected to a resistor 70 and to a terminal 72 via a conductor 74, a feedback loop 76 being connected between the output of the operational amplifier 66 and the negative input thereto. A second terminal 78 is connected to ground via a conductor 79, as shown in FIG. 2. The terminals 72 and 78 are each constructed and disposed in the control apparatus 16 to be connected to the electrodes 22 and 24 via the conductors 28 and 30, as shown in FIG. 1, the conductor 28 being connected to the terminal 72 and the conductor 30 being connected to the terminal 78, for example, thereby connecting the electrodes 22 and 24 in the output circuit of the operational amplifier 66. More particularly, the alternating current power source 62, the operational amplifier 66, the resistor 70 and the conductors 22 and 24 are connected such that the equivalent circuit comprised thereby places the electrodes 22 and 24 in series with the resistor 70, each being connected to the output of the operational amplifier 66. Thus, the measured voltage drop between the terminals 72 and 78 is related to the current produced at the output of the operational amplifier 66 and the resistance between the electrodes 22 and 24 and indicative of the internal cross-sectional area of the blood conduit 14, in a manner described before.

The voltaage measured between the terminal 72 and 78 and, more particularly, the voltage measured between the electrodes 22 and 24 is connected to the amplifier 36 via a resistor 80, and a variable resistor 82 is interposed between the electrodes 22 and 24 and the amplifier 36, the variable resistor 82 being more particularly connected to the conductor 74 generally between the resistor 70 and the terminal 72 and to the ground conductor 64, as shown in FIG. 2. The variable resistor 82 functions in the nature of a trim-pot for setting the magnitude of the output signal of the control apparatus 16 at a predetermined reference level.

The amplifier 36, more particularly, includes a first operational amplifier 84 producing an amplified output singal connected to a second amplifier 86 via a resistor 88, the two operational amplifiers 84 and 86 being utilized to provide the required amplification for the control apparatus 16. The positive input of each of the operational amplifiers 84 and 86 is connected to ground, the positive input of the operational amplifier 84 being connected to ground via a conductor 90 and the positive input of the second operational amplifier 88 beng connected to ground via a conductor 92, as shown in FIG. 2.

A feedback loop 94 is connected between the amplified output signal of the first operational amplifier 84 and the negative input thereto, and a second feedback loop 96 is connected between the amplified output signal of the second operational amplifier 86 and the negative input thereto, of the feedback loops 94 and 96 each being constructed in a similar manner, as schematically shown in FIG. 2. The feedback loop 94 includes a resistor 98 connected to the first operational amplifier output and to the negative input thereto, and a capacitor 100 connected to the resistor 98 and to a junction 102; the resistor 80, the capacitor 100, a variable resistor 104 and a capacitor 106 each being connected to the junction 102, as shown in FIG. 2. The junction 102 is connected to the negative input of the first operational amplifier 84 and the capacitor 106 is interposed between the junction 102 and the connection between the resistor 98 and the negative input of the first operational amplifier 84, the variable resistor 104 being, more particularly, connected to the junction 102 between the resistor 80 and the capacitor 106 and the ground.

The feedback loop 96, more particularly, includes a resistor 108 connected to the amplified output signal of the second operational amplifier 86 and of the negative input thereto, a capacitor 110 being connected to the resistor 108 and to a junction 112. The resistor 88, the capacitor 110, a variable resistor 114 and a capacitor 116 are each connected to the junction 112, and the junction 112 is connected to the negative input of the second operational amplifier 86. The capacitor 116 is, more particularly, interposed between the junction 112 and the connection between the resistor 108 and the negative input of the second operational amplifier 86, the variable resistor 114 being, more particularly, connected to the junction 112 and to ground. The amplified output signal from the second operational amplifier 86 is connected to an output terminal 118, and the signal measured at the output terminal 118 and an output ground terminal 120 connected to the ground conductor 64 is the detector output signal 46, as shown in FIG. 1, the output signal measured at the output terminals 118 and 120 being indicative of the voltage drop measured between the electrodes 22 and 24 and thus indicative of the internal cross-sectional area of the blood conduit 14.

A pair of diodes 122 and 124 are interposed between the second operational amplifier 86 and the output terminal 118, and a third diode 126 is connected between the diodes 122 and 124 and ground. A filter capacitor 128 is connected between the pair of diodes 122 and 124 and the output terminal 118 and to the ground conductor 64, as shown in FIG. 2.

During the operation of the control apparatus 16, the voltage between the terminals 72 and 78 (between the electrodes 22 and 24) is connected to and amplified by the first and the second operational amplifiers 84 and 86, the variable resistor 82 being interposed between the terminals 72 and 78 and the input to the first operational amplifier 84 to provide a controlled input signal thereto proportional to the voltage drop between the electrodes 22 and 24, thereby controlling the output signal of the control apparatus 16. The filter 40 includes the variable resistors 104 and 114, each resistor 104 and 114 being adjustable to eliminate undesirable noise and interference as generally mentioned before.

The diodes 122 and 124 are each forward biased during the positive-going portion of the amplified output signal from the second amplifier 86, thereby conducting an output signal to the output terminal 118, the diode 126 being reversed biased during the positive-going portion of the output signal from the second amplifier 86. During the negative-going portion of the amplified output signal from the second operational amplifier 86 the diodes 122 and 124 are each reversed biased blocking the signal between the amplifier 36 and the output terminal 118, the diode 126 being forward biased during the negative-going portion of the output signal from the second operational amplifier 86 conducting the negative-going singal to ground.

The detector capacitor 128 cooperates with the diode 124 to assure a relatively steady positive signal at the output terminal 118, the detector capacitor 128 also functioning to filter an A-C transient portion of the output signal to ground. The output signal of the control apparatus 16 thus provides a relatively steady, positive signal, indicative of the voltage drop between the electrodes 22 and 24, the output signal at the output terminal 118 and the output terminal 120 being connected to the output indicator 48 and to the compensating network 50, as shown in FIG. 1, in a manner described before.

In summary, the method and apparatus of the present invention provide a determination of the cross-sectional area of the blood conduit 14 in a manner eliminating the necessity of surgical exposure of the blood conduit 14, and, in one form, provide an output indication indicative of the instantaneous and the continuous volumetric flow of fluid through the blood conduit 14. In one other aspect, the method and apparatus of the present invention also provide an in vivo determination of the conductivity of the fluid flowing through the blood conduit 14, in a manner described before.

The pair of electrodes 22 and 24 are then disposed within the blood conduit 14 and spaced a predetermined distance apart which, in one form, is accomplished via the catheter 12, having the electrodes 22 and 24 secured thereto and spaced apart the distance 26, the catheter 12, inserted lengthwise through the blood conduit 14. The catheter 12 is inserted lengthwise through the blood conduit 14 and positioned within the blood conduit 14 at a predetermined position utilizing a fluoroscope control, for example, thereby disposing the electrodes 22 and 24 at a predetermined position within the blood conduit 14.

After the electrodes 22 and 24 have been disposed at a predetermined position within the blood conduit 14, the electrodes 22 and 24 are connected to the electrical power source 32 and a predetermined, known current is impressed between the electrodes 22 and 24. The electrical parameter indicative of the cross-sectional area of the blood conduit 14 generally between the electrodes 22 and 24 is then measured and determined while the known current is impressed therebetween. In one preferred embodiment, the electrical resistance or, more particularly, the voltage drop between the two electrodes 22 and 24 impressed with the predetermined, known current is measured via the control apparatus 16, the measured and determined voltage drop between the two electrodes 22 and 24 providing an output signal indicative of the cross-sectional area of the blood conduit 14, generally between the electrodes 22 and 24.

In one preferred embodiment, as described before, the electrodes 22 and 24 and the flow transducer 20 are each secured to the catheter 12 and simultaneously interposed at a predetermined positionwithin the blood conduit 14 via inserting the catheter 12 lengthwise through the blood conduit 14. The velocity signal 60 produced by the flow transducer 20 provides an output indication indicative of the velocity or rate-of-flow of the fluid (blood) through the blood conduit 14 and the velocity signal 60 is combined with the in vitro or the in vivo determined conductivity or the determined permittivity or the permeability of the fluid flowing through the blood conduit along with the known spacing 26 between the electrodes 22 and 24 to provide an output indication indicative of the internal cross-sectional area of the blood conduit 14 generally between the electrodes 22 and 24 utilizing the relationship (1), (2) or (3), described before.

In one other form, described before, the measured and determined voltage drop between the two electrodes 22 and 24 is linearized via the compensating network 50, and the linearized compensating network output signal 52 in connected to a compensated output indicator 54 to provide an output indication linearly indicative of the cross-sectional area of the blood conduit generally between the electrodes 22 and 24, in a manner described in detail before.

Finally, it should be noted that, although the method and apparatus of the present invention have been more particularly described herein with respect to measuring and determining blood flow parameters through a blood conduit, the methods and apparatus are each equally applicable to the determination of flow parameters of any other type of fluid through a fluid conduit. Thus, it is to be specifically understood that the terms "blood" and "blood conduit" are not to be limited in a manner excluding these additional applications, and reference has been made herein to the one specific application for the purpose of clarity of description and unique applicability.

Changes may be made in the construction and the arrangement of the parts or the elements of the apparatus disclosed herein and in the steps of the method disclosed herein without departing from the spirit and scope of the invention as defined in the following claims.

What is claimed is:

1. Apparatus for determining parameters of a fluid flowing through a conduit or the like comprising:
   means for insertion within the conduit;
   a pair of electrodes, each electrode secured to the means for insertion within the conduit and the pair of electrodes spaced apart a predetermined distance;
   electrical power source means connected to the pair of electrodes impressing a predetermined electrical energy therebetween;
   circuit means electrically connected to the electrodes of the pair of electrodes measuring and determining the voltage drop between the electrodes of the pair of electrodes impressed with the predetermined electrical energy and providing an output indication indicative of the measured and determined voltage drops, the measured and determined voltage drop being indicative of the internal cross-sectional area of the conduit generally between the electrodes;
   output indicator means, having programmed therein the distance between the electrodes, receiving the measured and determined voltage drop between the electrodes, receiving a provided input signal indicative of the fluid conductivity, receiving the impressed predetermined electrical energy between the electrodes, and providing an output indication indicative of the internal cross-sectional area of the conduit.

2. Apparatus for determining parameters of a fluid flowing through a conduit or the like comprising:
   means for insertion within the conduit;
   a pair of electrodes, each electrode secured to the means for insertion within the conduit and the pair of electrodes spaced apart a predetermined distance;
   electrical power source means connected to the pair of electrodes impressing a predetermined electrical energy there-between;
   circuit means electrically connected to the electrodes of the pair of electrodes measuring and determining a voltage drop between the electrodes of the pair of electrodes impressed with the predetermined electrical energy and providing an output indication indicative of the measured and determined voltage drop, the measured and determined voltage drop being indicative of the internal cross-sectional area of the conduit generally between the electrodes; and compensating network means connected to the means measuring the voltage drop and linearizing the relationship between the measured and determined voltage drop and internal cross-sectional area of the conduit providing a compensated output linearly indicative of the internal cross-sectional area of the conduit generally between the pair of electrodes.

3. Apparatus for determining parameters of a fluid flowing through a conduit or the like comprising:
   means for insertion within the conduit;
   a pair of electrodes, each electrode secured to the means for insertion within the conduit and the pair of electrodes spaced apart a predetermined distance;
   electrical power source means connected to the pair of electrodes impressing a predetermined electrical energy therebetween;
   a pair of condutivity sensing electrodes secured to the means for insertion within the conduit, the conductivity sensing electrodes being disposed generally near and between the electrodes of the pair of electrodes;
   means connected to conductivity sensing electrodes priviting a conductivity signal indicative of the conductivity of the fluid flowing within the conduit; and
   circuit means electrically connected to the electrodes of the pair of electrodes measuring and determining an electrical parameter between the electrodes of the pair of electrodes impressed with the predetermined electrical energy and providing an output indication indicative of the measured and determined electrical parameter, the measured and determined electrical parameter being indicative of the internal cross-sectional area of the conduit generally between the electrodes.

4. Apparatus for determining parameters of a fluid flowing through a conduit or the like comprising:
   means for insertion within the conduit;
   a pair of electrodes, each electrode secured to the means for insertion within the conduit and the pair of electrodes spaced apart a predetermined distance;

electrical power source means connected to the pair of electrodes impressing a predetermined electrical energy therebetween;

a pair of conductivity sensing electrodes secured to the means for insertion within the conduit, the conductivity sensing electrodes being disposed generally near and between the electrodes of the pair of electrodes;

means connected to conductivity sensing electrodes providing a conductivity signal indicative of the conductivity of the fluid flowing within the conduit;

circuit means electrically connected to the electrodes of the pair of electrodes measuring and determining the voltage drop between the electrodes of the pair of electrodes impressed with the predetermined electrical energy and providing an output indication indicative of the measured and determined voltage drop, the measured and determned voltage drop being related to the electrical resistance generally between the pair of electrodes and indicative of the cross-sectional area of the conduit; and output indicator means, having programmed therein the determined values of current and distance between the electrodes of the pair of electrodes, receiving the conductivity signal, the measured and determined voltage drop between the electrodes of the pair of electrodes and proving an output indication indicative of the internal cross-sectional area of the conduit.

5. Method for determining the internal cross-sectional area of a blood conduit or the like having blood or the like flowing therethrough, the method comprising the steps of:

disposing a first pair of electrodes within the blood conduit spaced apart a predetermined distance;

impressing a predetermined, known electrical energy between the electrodes of the first pair of electrodes;

measuring the voltage drop of the blood flowing through the blood conduit between the electrodes of the first pair of electrodes impressed with the known electrical energy, the measured voltage drop being indicative of the electrical resistance generally between the first pair of electrodes impressed with the known electrical energy defined as the current impressed generally between the electrodes of the first pair of electrodes; disposing a second pair of electrodes within the blood conduit spaced apart a predetermined distance generally near and between the electrodes of the first pair of electrodes;

measuring the conductivity of the blood flowing within the blood conduit utilizing the second pair of electrodes to provide determination of the blood conductivity; and determining the internal cross-sectional area of the blood conduit as determined via the relationship:

$$\frac{V}{I} = \frac{l}{\rho A}$$

wherein

V = the measured voltage drop between the electrodes of the first pair of electrodes;

I = the known current impressed between the electrodes of the first pair of electrodes;

l = the known distance between the electrodes of the first pair of electrodes;

ρ = the measured conductivity of the blood flowing within the blood conduit; and A = the internal cross-sectioal area of the blood conduit generally between the electrodes of the first pair of electrodes.

6. Method for determining the internal cross-sectional area of a blood conduit or the like having blood or the like flowing therethrough, the method comprising the steps of:

disposing a first pair of electrodes within the blood conduit spaced apart a predetermined distance;

impressing a predetermined, known electrical energy between the electrodes of the first pair of electrodes;

determining the electrical capacitance of the blood flowing through the blood conduit between the electrodes of the first pair of electrodes impressed with the known electrical energy;

measuring the permittivity ($\epsilon$) of the blood flowing through the blood conduit; and determining the internal cross-sectional area of the blood conduit via the relationship:

$$C = \frac{\epsilon A}{l}$$

wherein:

C = the determined electrical capacitance between the electrodes of the first pair of electrodes;

$\epsilon$ = the measured permittivity of the blood flowing through the blood conduit;

A = the internal cross-sectional area of the blood conduit generally between the electrodes of the first pair of electrodes; and l = the known distance between the electrodes of the first pair of electrodes.

7. Method for determining the internal cross-sectional area of a blood conduit or the like having blood or the like flowing therethrough, the method comprising the steps of:

disposing a first pair of electrodes within a blood conduit spaced apart a predetermined distance;

impressing a predetermined, known electrical energy between the electrodes of the first pair of electrodes; and determining the electrical inductance of the blood flowing through the blood conduit between the electrodes of the first pair of electrodes impressed with the known electrical energy;

measuring the permeability ($\mu$) of the blood flowing through the blood conduit; and determining the internal cross-sectional area of the blood conduit via the relationship:

$$L = \frac{\mu A}{l}$$

wherein:

L = the determined electrical inductance between the electrodes of the first pair of electrodes;

$\mu$ = the measured permeability ($\mu$) of the blood flowing through the conduit;

l = the known distance between the electrodes of the first pair of electrodes; and A = the internal cross-sectional area of the blood conduit generally between the electrodes of the first pair of electrodes.

* * * * *

PO-1050
(5/69)

UNITED STATES PATENT OFFICE
CERTIFICATE OF CORRECTION

Patent No. 3,896,373            Dated July 22, 1975

Inventor(s) Dr. Leon W. Zelby

It is certified that error appears in the above-identified patent and that said Letters Patent are hereby corrected as shown below:

Col. 10, line 38 "emmpirically" should be --empirically--

Col 16 line 64 "positionwithin" should be --position within--

Col 18 line 48 "prividing" should be --providing--

Col 19 line 18 "determned" should be --determined--

Col 20 line 5 "cross-sectioal" should be --cross sectional--

Signed and Sealed this twenty-third Day of December 1975

[SEAL]

Attest:

RUTH C. MASON
*Attesting Officer*

C. MARSHALL DANN
*Commissioner of Patents and Trademarks*